April 15, 1941.  L. W. GENSBURG  2,238,317
STEP-UP RATCHET
Filed Nov. 4, 1940

Louis W. Gensburg
INVENTOR.
BY Clarence E. Threedy
HIS ATTORNEY.

Patented Apr. 15, 1941

2,238,317

UNITED STATES PATENT OFFICE 2,238,317

STEP-UP RATCHET

Louis W. Gensburg, Chicago, Ill., assignor to Genco Mfg. Co., Chicago, Ill., a partnership consisting of Louis W. Gensburg, David Gensburg, and Myer Gensburg Application November 4, 1940, Serial No. 364,237

2 Claims. (Cl. 74—578)

This invention relates to certain novel improvements in step-up ratchets and has for its principal object the provision of an improved construction which will be highly efficient in use and economical in manufacture.

Among the salient objects of the invention is the provision of a step-up ratchet arranged and constructed in a manner such that the ratchet wheel proper thereof is restrained against backlashing or moving forward more than one step at a time or a distance equivalent to that which the ratchet is intermittently stepped up.

Another object of the invention is the provision of a step-up ratchet which is arranged and constructed in a manner such as permits its adaptability for many uses and particularly in connection with mechanical devices requiring a step-up ratchet.

Other objects will appear hereinafter.

The invention consists in the novel combination and arrangement of parts to be hereinafter described and claimed.

The invention will be best understood by reference to the accompanying drawing showing the preferred form of construction, and in which.

Figure 1:
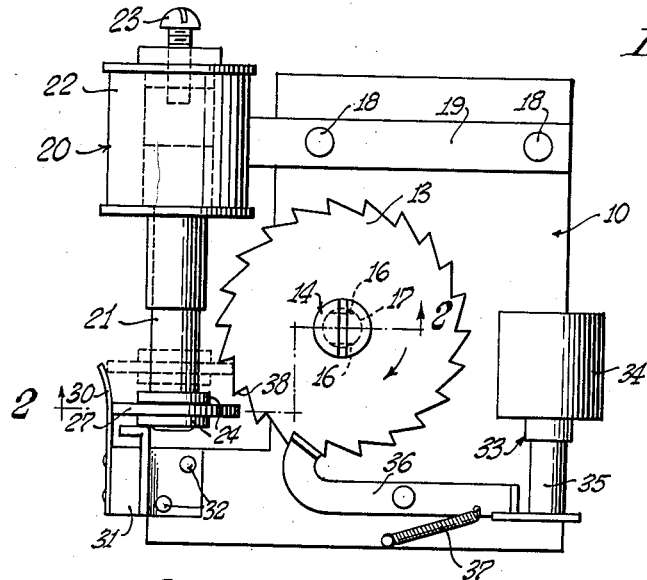
Fig. 1 is a side elevational view of the step-up ratchet embodying the invention.
Figure 2:
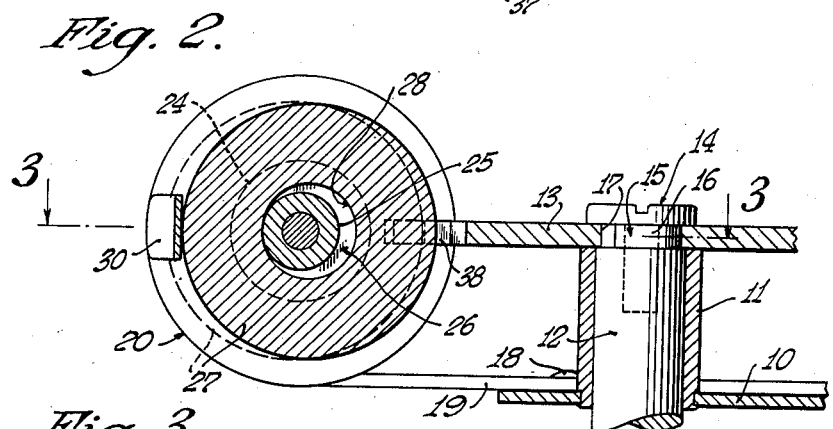
Fig. 2 is a sectional detail view of the same taken substantially on line 2—2 of Fig. 1.
Figure 3:
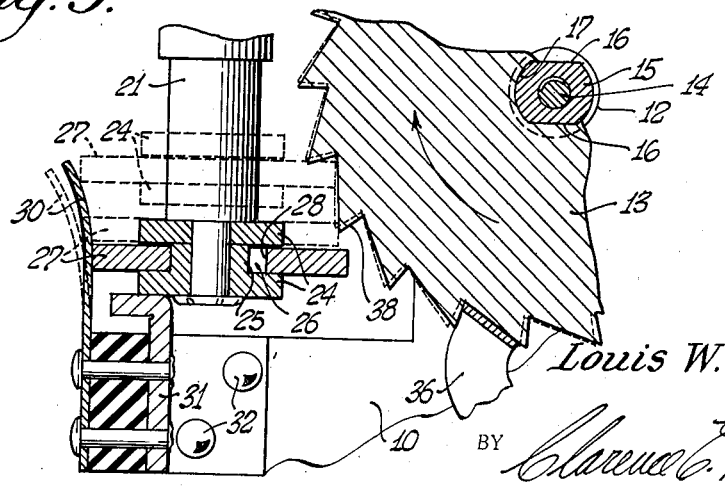
Fig. 3 is an enlarged sectional detail view of the same taken substantially on line 3—3 of Fig. 2.

The preferred form of construction of my invention is illustrated in the drawing filed as a part of this application. I therefore do not want to be limited to the precise structure shown, but desire to avail myself of such modifications and variations as come within the scope of the appended claims. In this connection, a mounting plate is indicated at 10. This plate 10 is utilized to mount the device in association with the mechanism with which it is used.

Journaled in a bearing 11 carried by this mounting plate 10 is a shaft 12, and this shaft 12 is connected with associated mechanism operated by the step-up ratchet constituting my invention. On this shaft 12 is fixedly secured a removable ratchet wheel 13. This is accomplished through the medium of a set screw 14 threaded into a stud shaft 15 having flattened sides 16 and projected into an opening 17, formed in the ratchet wheel 13 and conforming to the shape of this stud shaft 15.

Mounted on the mounting plate 10 as at 18 is a supporting bracket 19. This bracket 19 supports an electromagnetic device 20 in the form of a solenoid, the armature of which is indicated at 21. The movement of the armature 21 within the coil 22 of the solenoid is adjusted by means of a set screw 23. The armature 21 at its exterior lower end portion carries opposite disc members 24 spaced substantially from each other by a central hub 25 to provide an annular recess 26 shiftably within which is arranged a dog or pawl in the form of a washer 27. The shiftability of this dog 27 results from the fact that the aperture 28 formed in the dog is of a substantially greater diameter than the diameter of the shoulder 25. The dog 27 is arranged adjacent the peripheral edge of the ratchet wheel 13 and is normally urged toward that edge by means of a leaf spring 30 carried by a bracket 31 secured as at 32 to the mounting plate 10.

The ratchet wheel is normally moved into resetting position or retracted position in the usual and well known manner, preferably through the medium of a suitable coil spring which is placed under tension each time the ratchet wheel is advanced and tends to retract the ratchet wheel when released by the resetting mechanism which is indicated at 33 and comprises an electric solenoid 34, the armature 35 of which controls the pivotal movement of a latching lever 36 normally held in latched position to the peripheral edge of the ratchet wheel 13 by means of a spring 37.

The arrangement is such that when the armature 21 of the solenoid or electric device 20 is moved upwardly or inwardly, the dog 27, being spring-held in the path of an adjacent tooth 38 of the ratchet wheel 13, will engage such tooth and rotate the ratchet wheel and the shaft 12 one step. Inasmuch as the dog 27 is held inwardly or against the peripheral edge of the ratchet wheel by the spring 30, it is manifest that when the dog is in the position shown in dotted lines (Fig. 1) the ratchet wheel 13 is restrained from moving a greater distance than that imparted thereto by the operation of the solenoid or electromagnetic device 20. When the armature moves to its outer or lowermost position, the dog 27 will yieldably slide off the adjacent tooth into its normal lowermost position.

Thus, it is apparent that I have provided a positive means for moving a ratchet wheel in step by step movement and at the same time arranging this means to serve as a means for preventing the ratchet wheel from moving more than the required movement as a result of the operation of the armature 21.

It is also manifest that should the latch 38 be disconnected from a tooth of the ratchet during the operation of the armature 31 to advance the ratchet wheel, the spring-held dog 27 will prevent any backlashing of the ratchet wheel during this temporary disengagement of the latching lever 36 from an adjacent tooth of the ratchet wheel.

The device is simple in structure and can be manufactured at a very nominal cost. It consists of few parts, which reduces the wear and tear to a minimum.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination, a mounting plate, a rotatable shaft journaled therein, a ratchet wheel on said shaft and movable therewith, an electromagnetic device on said mounting plate and including an armature, a head on said armature providing an annular recess, and a washer-like dog carried by said head and movable in said recess in a direction to and from engagement with said ratchet wheel, and means for moving said dog into said engagement with said ratchet wheel.

2. In combination, a mounting plate, a rotatable shaft journaled therein, a ratchet wheel on said shaft and movable therewith, an electromagnetic device on said mounting plate and including an armature, a head on said armature providing an annular recess, and a washer-like dog carried by said head and movable in said recess in a direction to and from engagement with said ratchet wheel, and spring means carried by the plate and engaging said dog for yieldably urging said dog into shifted position with respect to the head and into operative engagement with the ratchet wheel.

LOUIS W. GENSBURG.